United States Patent [19]
Klein et al.

[11] 3,885,238
[45] May 20, 1975

[54] PHASE LOCKED LOOP RECEIVING SYSTEM WITH IMPROVED SIGNAL ACQUISITION

[75] Inventors: Albert M. Klein, Chatsworth; Masaaki Fujita, Los Angeles, both of Calif.

[73] Assignee: International Telephone and Telegraph Corporation, New York, N.Y.

[22] Filed: Nov. 24, 1969

[21] Appl. No.: 879,414

[52] U.S. Cl. ............................. 343/7 A; 343/17.5
[51] Int. Cl. ........................... G01s 7/40; G01s 9/02
[58] Field of Search ........................ 343/7 RS, 17.5

[56] References Cited
UNITED STATES PATENTS
3,183,506   5/1965   Webb.............................. 343/17.5 X
3,241,137   3/1966   Smoll................................... 343/6.8
3,242,487   3/1966   Hammack........................ 343/7 RS
3,530,470   9/1970   Sheftelman et al............ 343/6.5 LC Primary Examiner—Malcolm F. Hubler
Attorney, Agent, or Firm—William T. O'Neil

[57] ABSTRACT

An improved phase locked loop of the type used in systems for receiving and measuring a variable frequency signal, such as a Doppler signal from a Radar illuminated moving target. A unique self-calibrate loop is provided to compensate for VCO (voltage-controlled oscillator) drift, and a memory hold keeps the VCO on means frequency during an automatic search interval. The result is that the VCO sweep used in acquisition may be more optimally pre-biased and acquisition or reacquisition of signals is accomplished more rapidly.

5 Claims, 1 Drawing Figure

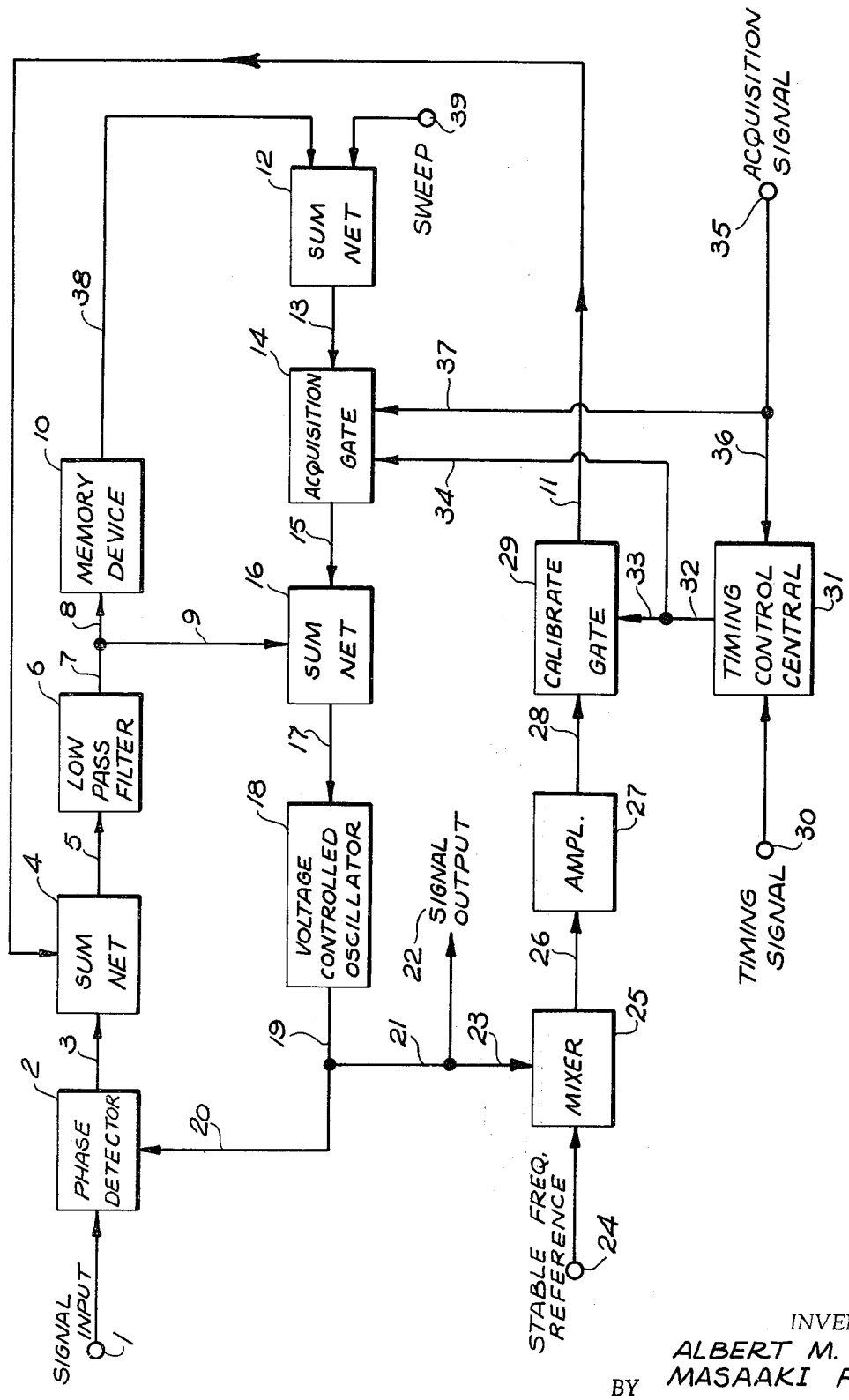

PHASE LOCKED LOOP RECEIVING SYSTEM WITH IMPROVED SIGNAL ACQUISITION

BACKGROUND OF THE INVENTION

1. Field of the Invention

The invention relates to systems for detection, tracking and measurement of variable frequency signals in noise and more particularly to phase locked loop systems for those purposes.

2. Description of the Prior Art

In the prior art, the general problem of signal detection in noise has received considerable attention. The information theory discipline has been applied both analytically and practically. In Chapter 9 of "Introduction To Radar Systems" by Merrill I. Skolnik, Library of Congress No. 61-17675, (McGraw Hill Book Co. 1962), the subject is discussed generally. In section 9.6 of that reference, a basic phase locked loop is presented.

The phase-locked loop concept has been variously applied in radar equipment, and is particularly useful in systems requiring the detection and measurement of the variable Doppler frequencies returned from or initiated by moving targets. The AN/SRN-9 (U.S. Navy nomenclature identifying a transient satellite receiving equipment for support navigational use) is an example of an equipment employing the phase locked-loop principle for detection and measurement of such Doppler frequencies. Actually, that equipment is part of a satellite navigational system and involves the tracking of artificial satellites which emit signals Doppler shifted over a range of frequencies extending as high as 10KHz. Obviously comb filter determination of Doppler frequencies for specific velocity measurement to the kind of accuracy required in a navigation system involves very large and expensive equipment.

The phase locked-loop concept offers the advantage of economical instrumentation in that the single VCO tracks the Doppler signal and mirrors it in a form readily measureable by counters, etc., to whatever accuracy is feasible, and at discrete time intervals as desired. The bandwidth of the loop need only be sufficient to pass the difference between the signal frequency and the frequency of the VCO. Thus, looking at the loop as the functional equivalent of a filter, the amount of noise present in the loop is much smaller than in a comparable non-tracking filter, which must be designed to accept the full range of expected (Doppler) frequencies. Consequently the useable sensitivity of a phase locked loop system is relatively high.

In the AN/SRN-9 elements provided include a phase detector, low pass filter and VCO, and also means for applying a VCO control analog value (timing signal).

During the sweep function, the VCO operates in "open loop" fashion and is therefore subject to drift. Also, it will be realized that the memory point about which the sweep occurs is a stored last analog value of the VCO control, which may or may not be an optimum sweep bias point for new signal acquistion.

In view of the foregoing and other limitations of the prior art, the present invention was developed. The advantages and the manner in which these are achieved will be apparent as this description proceeds.

SUMMARY OF THE INVENTION

It may be said that the general object of the present invention is the improvement of phase-lock loop systems, particularly in respect to more rapid acquisition of signals.

Basically, three modes of operation may be provided in a system constructed according to the present invention. As in prior art systems, there are the search mode and the tracking or phase-locked mode, but in addition, there is provided a calibrate mode. A timing control central basically selects among these modes.

In a satellite navigation system such as the AN/SRN-9, the tracking of an orbiting satellite begins each time the satellite rises (breaks over the horizon). The prior art techniques generally assume that the VCO sweep will cover the full frequency range of expected Doppler shift. In the AN/SRN-9 case, there are Doppler components ranging to ± 10KHz. It will be apparent that acquisition (or reacquisition in the event of tracking loss) imposes the requirement that the VCO be swept through this full range of possible Doppler. This is because the Doppler shift at acquistion will be greatly different, and, in fact, of opposite sense as compared to the last value (before setting) from the satellite. In addition, drift of the VCO and the analog tuning signal memory would be substantial during the time between satellite setting and the next rise.

As a practical fact, the range of first Doppler values at acquisition can be quite reliably estimated for satellite passes over the range of meridians useable in the system. By choosing some mean among this range of values to be used to pre-calibrate (i.e., bias) the VCO initial frequency, the required range of values of VCO sweep is greatly reduced.

An important feature of the present invention is the provision of a stable reference oscillator operating at the aforementioned mean Doppler (plus carrier) frequency, along with a tracking loop to permit the VCO to lock (calibrate) onto the reference frequency. Also provided is a control central for timing the operation of the entire system among the tracking, search and calibrate modes appropriate for the particular requirements.

To appreciate the importance of the present invention, the reader may consider the relationship between phase-locked loop bandwidth and maximum tracking rate. Typically, a maximum tracking rate might be on the order of 80 Hz/second for a 40 Hz loop bandwidth or about 30 Hz/sec for 20 Hz loop bandwidth. Since the tracking rate limitation similarly applies to acquisition, it would require 125 seconds to sweep the entire 10KHz band of expected Dopplers even at the higher of these two rates. Accordingly, the much more limited search frequency range possible in a system of the present invention, as explained, can effect a very significant reduction in lock-on time for the phase-locked loop.

Programming of the various functions through a timing central can readily control the system so as to effect the calibration cycle just before satellite rise. The search mode can then proceed by a further programmed step as soon as the satellite is in position to be tracked. The VCO tuning signal is stored in a memory so that if track is momentarily lost, search will be automatically reinstituted about the last remembered value. The same memory functions to store the VCO tuning signal corresponding to the reference frequency which acts as a searching sweep bias in the initial search period following the calibrate period.

Further detail in respect to the complete system will be given as this specification proceeds.

BRIEF DESCRIPTION OF THE DRAWING

The single FIGURE drawing is a block diagram of a phase locked-loop receiving system in accordance with the invention.

DESCRIPTION OF THE PREFERRED EMBODIMENT

The detailed description will be undertaken in the particular environment of a Doppler measuring phase-locked loop Satellite Navigational system, such as the aforementioned AN/SRN-9. It is to be understood, however, that its applicability is not limited to that equipment, or to equipments of that class. Its utility extends to any relatively sensitive phase locked-loop receiver frequency tracking system.

Referring now to the drawing, the input 1 consists of signals received from a receiver front end and may be (although not necessarily) at a superheterodyne intermediate frequency. The output 19 of VCO 18 goes to the signal output 22 via lead 21 which also supplies VCO signal on 23 to a mixer 25 (to be described later). The phase detector 2 compares the phase of signal 1 with VCO output applied at 20. The output of phase detector 2 at 3 is essentially a variable quantity as it is fed to summing network 4. Network 4 feeds in a comparable signal in the calibrate mode, equal to the beat of the VCO and stable frequency reference 24 in mixer 25, to be described later. The output of 4 is passed via lead 5 into low pass filter 6 and then leads 7 and 8 into the memory device 10 and also via lead 9 to sum network 16 where the error (VCO control analog signal) is mixed with the memory point biased sweep, if the latter is operative at the time. Lead 17 completes the primary tracking loop by providing the said control analog signal (tuning signal) to VCO 18. In referring to this signal as a voltage, it will be realized that in solid state circuitry it may actually be a variable current. The system of the invention is readily instrumented according to solid state circuit techniques or in accordance with vacuum tube technology.

Regarding the acquisition gate 14 as open for the moment, no signals are present on 15 and the output 17 of summing network 16 is only that coming into it on 9. Thus, the elements 2, 4, 6, 16 and 18 form a closed tracking loop and operate this way in the phase-lock mode without inter-relation to the other circuit elements of FIG. 1.

In view of the quite predictable satellite position data, the timing control (programmer) 31 can readily be made to initiate the calibrate mode of operation just before the time of satellite rise to an angle above the horizon, which would permit reception of its Doppler affected transmitted signals.

Thus, the timing control 31 will be seen to be a real time programmer for initiating the calibrate mode. A control signal at 32 operates to close the calibrate gate at that time. Another loop comprising 25, 27, 29, 4, 6, 16 and 18 comes then into operation. The acquisition gate 14 will at that time be controlled to the nonoperative state by an appropriate signal on 34 and the calibrate gate 29 would also be similarly controlled to be operative by 31 via leads 32 and 33.

The operation of the calibrate loop is quite similar to the tracking loop except that the signal of the stable frequency reference at 24 is tracked in place of the signal input at 1. Mixer 25 provides a difference signal at 26 which is the beat of signals at 23 and 24. This signal is amplified in 27 and passed on 28 through the now operative calibrate gate and, via lead 11, is supplied to the sum network 4 where it takes the place of a signal on 3 which is only present during tracking. The remainder of the loop to the point of providing the tuning signal at 17 operates as heretofore explained. The result is that the VCO is driven to the reference frequency.

As the calibrate mode operates, the memory 10 may be said to be "storing" the value of tuning voltage which controls the VCO 18 to the frequency of said reference.

The output at 38 of the memory 10 exhibits this stored value of tuning voltage and mixes this with the searching sweep supplied at 39 in the summer 12. The tuning voltage on 38 can thus be thought of as a bias point about which the tuning voltage is varied by the sweep. This mixed signal is available at 13 and is supplied to acquisition gate 14.

Once the calibrate loop has settled to its steady state condition (a predictable interval) the acquisition gate 14 is made operative by a control signal on 34 from timing control unit 31 and the calibrate gate 29 is contemporaneously made inoperative by a suitable control signal on 33. This initiates the searching cycle by passing the said swept timing signal on 13 through to 15, where it is mixed with the normal tuning signal feedback from 9. Since no signal at 1 is yet being tracked, the signal is essentially the same at 17, as at 15.

The said sweep at 39 may be of any shape consistent with system requirements. It could easily be a symmetrical triangular bipolar wave to sweep in both senses about the stored tuning voltage on 38.

Acquistion of an input signal may be manually or automatically recognized by external circuits which provide a control signal at 35. This acquisition signal makes the acquisition gate 14 inoperative via control lead 37 and at the same time, performs a reset in the timing control central 31 via control lead 36. The calibrate gate 29 remains open at this time. The timing central performs no further function until the next automatic calibrate interval arrives, except that if acquisition does not occur within a predetermined time in the switch mode (no signal appears at 35), the timing control central 31 automatically reinitiates the calibrate mode to compensate for the inevitable VCO mean frequency drift during search.

A basic timing or clock signal at 30 functions to relate the operation of the timing control central 31 to the overall time relationships in the system.

It will be noted that the memory 10 is in a position to "store" the tuning voltage at 7 in open loop fashion during tracking (phase locked operation). Should phase lock be lost for any reason, the memory will provide a bias for the sweep which is representative of the last frequency of the input signal at 1. Immediate return of the acquisition gate 14 to conduction reapplies the search sweep in response to a change of condition of acquisition signal 35. Searching is thus accomplished about the most recent signal input frequency at 1, and the same advantage hereinbefore recited in respect to minimal sweep limits during search for original acquisition also applies in the case of tracking loss.

The actual structure of each of the functional blocks of FIG. 1 will be apparent to those skilled in the art, once the inventive concepts are understood. The timing control central is preferably of the digital type which bases its control functions on counting of basic timing pulses at 30. The memory 10 need only provide temporary, relatively short-term storage, and may be as simple as a long time constant RC circuit. Low pass filter 6 is obviously designed with loop signal to noise ratio and maximum loop tracking rate in Hz per second in mind. The three summing networks are straightforward additive signal combiners and are well known per se. Voltage controlled oscillators are well known in automatic frequency control and other applications, as are the phase detectors and mixers as required at 2 and 25, respectively.

Various modifications falling within the spirit and intended scope of the invention may be made. The invention is not limited to the specific elements described. The drawing is to be considered illustrative only.

What is claimed is:

1. In a phase-locked loop receiving system having a tracking mode of operation for tracking a variable frequency received signal including an analog signal-controlled oscillator, means for comparing the phase of received signals with the phase of the output of said controlled oscillator to generate a first error signal, and means responsive to said first error signal for generating and applying a tuning signal which is a function of said first error signal to said controlled oscillator to form a closed tracking loop, the combination comprising:

a reference frequency source operating at a predetermined reference frequency within the range of expected frequency variation of said variable frequency received signal;

means for comparing said reference frequency with said output of said signal-controlled oscillator to produce a second error signal;

switching means arranged to substitute said second error signal in place of said first error signal to generate said tuning signal during a first predetermined time interval, thereby to establish a calibrating mode of operation;

a periodic wave generator and means for superimposing the output of said periodic wave generator on said tuning signal beginning at the outset of a second time interval to initiate a corresponding searching mode of operation;

and second switching means responsive to a predetermined condition of said first error signal during said second time interval, said predetermined condition corresponding to phase lock-on within said tracking loop, to remove said periodic wave from said tuning signal thereby to permit said loop to operate in phase lock.

2. The invention set forth in claim 1 in which said means for superimposing said periodic wave is adapted to thereby vary said tuning signal substantially over limits corresponding to the limits of expected received signal frequencies at the beginning of said second interval.

3. The invention set forth in claim 1 in which there is included a memory circuit within said tracking loop responsive to said first and second error signals during corresponding intervals, to provide an output which is representative of the last value of said tuning signal during a mode of operation of said tracking loop other than said searching mode.

4. The invention set forth in claim 2 further defined in that memory means are included in said tracking loop, and means are also included for connecting said first error signal to said memory means during said second interval and said second error signal during said first interval, thereby to cause said memory to retain a value of said tuning signal applied to said signal-controlled oscillator, which is representative of the frequency of the last received signal in said tracking mode and of said reference frequency in said calibrating mode of operation.

5. A system for receiving an electromagnetic energy signal from a rising and setting satellite, said signal including a Doppler frequency component varying throughout the visible travel of said satellite and said receiving system including a phase-lock loop for frequency tracking said received energy signal, said system comprising the combination of:

first means within said phase-lock loop including an oscillator controllable by an electrical control signal, means for comparing the frequency of said oscillator with the frequency of said received energy signal to develop and apply said control signal to said oscillator as a feedback signal to tend to bring said oscillator frequency into continuous synchronism with said variable frequency received energy signal;

second means for superimposing a sweep signal on said control signal to cause said oscillator to sweep correspondingly in frequency for searching to acquire said received energy signal for frequency tracking;

third means for providing a calibration mode, said means connecting an externally provided reference frequency signal to said first means in lieu of said received energy signal for presetting said oscillator to said reference frequency approximately the expected frequency of said satellite at said rising thereby to minimize the required excursion of said oscillator frequency sweep;

and fourth means responsive to external timing control to enable said third means for a time preceding the expected time of rise of said satellite, to disable said third means and enable said second means at a time approximately corresponding to said satellite rise, said fourth means being also responsive to an external acquisition signal to disable said second means and permit said first means to frequency track said received energy signal.

* * * * *